United States Patent [19]

Saitoh

[11] Patent Number: 4,851,469

[45] Date of Patent: Jul. 25, 1989

[54] RUBBER COMPOSITIONS AND HOSES USING THE SAME

[75] Inventor: Tomoji Saitoh, Hiratsuka, Japan

[73] Assignee: The Yokohama Rubber Co., Ltd., Japan

[21] Appl. No.: 273,746

[22] Filed: Nov. 16, 1988

Related U.S. Application Data

[63] Continuation of Ser. No. 205,005, Jun. 3, 1988, abandoned, which is a continuation of Ser. No. 926,545, Nov. 4, 1986, abandoned.

[30] Foreign Application Priority Data

Nov. 5, 1985 [JP] Japan .................................. 60-247737

[51] Int. Cl.$^4$ ............................................. C08K 3/36
[52] U.S. Cl. ...................................... 524/566; 524/571; 524/575; 524/575.5
[58] Field of Search ..................... 524/571, 575.5, 511, 524/566, 575

[56] References Cited

U.S. PATENT DOCUMENTS

| | | | |
|---|---|---|---|
| 3,480,508 | 11/1969 | Roy | 524/511 |
| 3,692,734 | 9/1972 | Klotzer et al. | 524/575.5 |
| 3,821,133 | 6/1974 | Doran et al. | 524/511 |
| 3,847,727 | 11/1974 | Kindle et al. | 524/511 |
| 4,014,827 | 3/1977 | Hart et al. | 524/511 |
| 4,511,697 | 4/1985 | Sohnemann | 524/511 |
| 4,636,550 | 1/1987 | Wolff et al. | 524/571 |

*Primary Examiner*—Lewis T. Jacobs
*Attorney, Agent, or Firm*—Finnegan, Henderson, Farabow, Garrett & Dunner

[57] ABSTRACT

Rubber compositions are disclosed which are capable of exhibiting superior adhesion and high water resistance in bonding rubbers to brass and to organic fiber cords and also to different rubbers. Such bonding characteristics can be obtained by the use of specified amounts of a selected class of organic sulfur-containing compounds combined with sulfur-curable rubbers, silica, resorcin donors and methylene donors. Hoses are also disclosed which have these compositions applied as adhesive layers.

4 Claims, 1 Drawing Sheet

RUBBER COMPOSITIONS AND HOSES USING THE SAME

This is a continuation of Ser. No. 205,005, filed 6/3/88, now abandoned, which is a continuation of Ser. No. 926,545, filed 11/4/86, now abandoned.

BACKGROUND OF THE INVENTION

1. Field of the Invention

This invention relates to rubber compositions and to hoses having such compositions incorporated.

2. Prior Art

There have arisen various problems in bonding rubbers of different formulations as well as in bonding rubbers with such metallic and fibrous materials as commonly employed to reinforce rubber products. Cements, and rubber-based compositions in particular are widely used as adhesives for such bonding.

A variety of rubber-based compositions have been proposed to bond rubbers to brass and to organic fiber cords treated with a blend of a resorcin-formalin condensate and a latex (hereinafter referred to as "RFL") and also to other different rubbers. One such composition has sulfur added in large amounts. Another composition is known in which is introduced a silica-resorcin donor-methylene donor component, also simply called "HRH". The resorcin donor here used is resorcin or a resorcin-formalin condensate, whereas the methylene donor is usually hexamethylenetetramine. A further prior art composition involves the use of a mercaptotriazine compound.

However, the sulfur-rich and HRH-containing adhesives are encountered with insufficient adhesion, hence reduced resistance to water, when applied to the bonding of rubbers with brass, RFL treated organic fiber cords or other rubbers. The mercaptotriazine-based adhesives forms a strong, water-resistant bond in rubber-to-brass bonding, but has been found totally unsatisfactory both in rubber-to-RFL treated fiber cord bonding and in rubber-to-rubber bonding. This has created an urgent need for improved rubber-based compositions which are capable of imparting strong adhesion to such metallic, fibrous and rubbery materials.

SUMMARY OF THE INVENTION

It has now been found that rubber compositions with excellent bonding characteristics can be obtained by the use of organic sulfur-containing compounds combined with sulfur-curable rubbers, silica, resorcin donors and methylene donors.

The rubber compositions according to the invention permit a direct bonding without an adhesive such as a cement or the like and also a wide choice of rubber materials for use in composite products to be bonded. They are effectively applicable as rubbery or adhesive layers to rubber products including hoses, belts and rolls.

It is therefore one object of the invention to provide novel rubber compositions which are highly capable of exhibiting sufficient adhesion and high water resistance in the bonding of rubbers to brass and to RFL treated organic fiber cords as well as to various other rubbers, giving composite products of enhanced durability.

Another object of the invention is to provide hoses having such compositions incorporated as adhesive layers.

These and other objects and advantages of the invention will be better understood from the following detailed description taken in connection with the accompanying drawings in which preferred embodiments of the invention are exemplified.

According to one aspect of the invention, a rubber composition comprises (a) a starting rubber vulcanizable with sulfur, (b) silica, (c) a resorcin donor, (d) a methylene donor and (e) an organic sulfur-containing compound in an amount of 0.1-15 parts by weight of 100 parts of the starting rubber.

According to another aspect of the invention, a hose comprises an inner tube, first and second reinforcing layers, at least one adhesive layer and an outer cover laminated peripherally one on another, the first and second reinforcing layers being wound or braided with brass plated wires or with organic fiber cords resulting from treatment with a mixture consisting essentially of a resorcin-formalin condensate and a latex, such one adhesive layer being disposed between the first and second layers and being derived from a rubber composition comprising (a) a starting rubber vulcanizable with sulfur, (b) silica, (c) a resorcin donor, (d) a methylene donor and (e) an organic sulfur-containing compound in an amount of 0.1-15 parts by weight of 100 parts of the starting rubber.

PREFERRED EMBODIMENTS OF THE INVENTION

Figure 1:
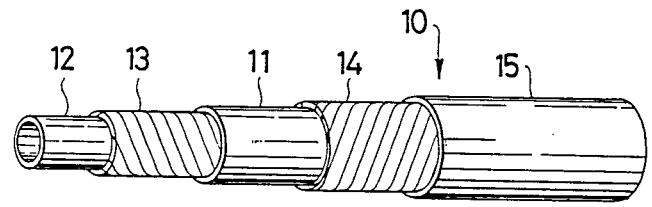
FIG. 1 is a segmentary, partly cut away, perspective view of a hose embodying the invention in which one adhesive layer is disposed peripherally between the first and second reinforcing layers wound with brass plated wires.

Rubber compositions according to the invention are characterized by the use of a certain class of organic sulfur-containing compounds in a mix in which are combined a starting rubber vulcanizable with sulfur, silica, a resorcin donor and a methylene donor.

There is no restriction imposed upon the composition of the mixes insofar as they contain a vulcanizing agent such as sulfur or the like. Those mixes are particularly desired which are composed of a sulfur-curable rubber of a diene type, silica in an amount of 1-100 parts, preferably 1-50 parts, a resorcin donor in an amount of 0.5-20 parts, preferably 1-10 parts, a methylene donor in an amount of 0.1-10 parts, preferably 0.5-5 parts, and a predetermined amount of a selected vulcanizer, respectively, by weight of 100 parts of the diene rubber.

In the case of silica, smaller amounts than 1 part would fail to give sufficient adhesion, and greater amounts than 100 parts would result in too much increased viscosity to warrant commercial application. Departures of the resorcin donor from the above specified range would be ineffective in adhesion. Smaller amounts than 0.1 part in the case of the methylene donor would induce insufficient adhesion, whereas greater amounts than 10 parts would result in reduced scorching time, leading to deteriorated vulcanizate.

Vulcanizing agents useful in the invention include for example sulfur, sulfur chloride and the like. The amount of the vulcanizer to be added should be in the range of 0.1–30 parts, preferably 0.5–10 parts, by weight of 100 parts of the diene rubber. Smaller amounts than 0.1 part would be ineffective in adhesion, and greater amounts than 30 parts would invite over-cured vulcanizate, resulting in reduced adhesion.

Specific examples of the diene rubber capable of sulfur vulcanization include natural rubber (NR), isoprene rubber (IR), styrene-butadiene rubber (SBR), acrylonitrile-butadiene rubber (NBR) and the like, and combinations thereof.

Organic sulfur-containing compounds eligible for the purpose of the invention are compounds having the following structural formula:

6-R,2,4-dimercapto-1,3,5-triazine [I]

More specifically, such compounds are represented by the formula:

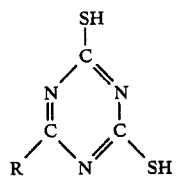

where R is a mercapto, alkoxy, mono- or di-alkyl amino, mono- or di-cycloalkyl amino, mono- or di-aryl amino or N-alkyl-N'-aryl amino group. Particularly preferred is 2,4,6-trimercapto-1,3,5-triazine which has a mercapto group attached to the R-position in the above formula.

In addition to the foregoing sulfur-containing compounds, conventional sulfur-donating compounds may be suitably employed. Such sulfur donors are sulfur-containing compounds which allow sulfur to be activated and liberated while in vulcanization and thus serve to act as vulcanizers and which include compounds of the structural formulae [II] and [III]:

$(R_2N\ CS)_2S_2$ [II]

and $(R_2N\ CS)_2S_4$ [III]

where R is one or more methyl, ethyl or pentamethylene groups or hydrogen atoms.

Specific examples of the compounds of the formula [II] include thiuram disulfides such as tetramethylthiuram disulfide, tetraethylthiuram disulfide, tetrapentamethylenethiuram disulfide and the like. Specific examples of the compounds of the formula [III] include thiuram tetrasulfides such as dipentanemethylene thiuram tetrasulfide and the like, and morpholine derivatives such as 4,4-dithiomorpholine, dimorpholine disulfide, 2-(4-morpholinodithio)benzothiazole and the like.

The amount of the sulfur-containing compound to be added should be in the range of 0.1–15 parts, preferably 0.5–5 parts, by weight of 100 parts of the diene rubber. Smaller amounts than 0.1 part would fail to give sufficient adhesion. Greater amounts than 10 parts would result in reduced scorching, leading to quality deterioration of the vulcanizate.

Vulcanization may preferably be effected at 140°–160° C. for 20–100 minutes and at a surface pressure in the order of 20–30 kg/cm$^2$.

There may be also used, where desired, conventional additives such as fillers, reinforcing agents, plasticizers, antioxidants and the like.

Strong, water-resistant bonds can be obtained by the use of the rubber compositions of the invention. Although the exact reason for the peculiar mode of bonding is not known, it is believed that the organic sulfur-containing compound combined with an HRH component presumably causes a strong adhesion reaction with brass, RFL treated organic fiber cords and different rubbers, compared to the HRH component alone, and thus contributes to improve adhesion.

With reference to the drawings, there are shown hoses which have the rubber compositions of the invention applied as adhesive layers. A hose designated at 10 in FIG. 1 comprises an adhesive layer 11, an inner rubber tube 12, first and second reinforcing layers 13, 14 and an outer rubber cover 15 superimposed peripherally one on another. The adhesive layer 11 is disposed between the two layers of reinforcement 13, 14 spirally wound with brass plated wires. The hose 10 is suitable for hydraulic application.

Figure 2:
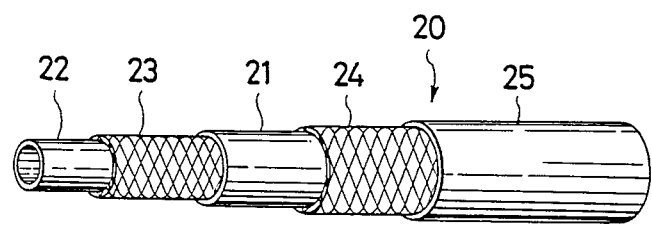
FIG. 2 is a view similar to FIG. 1, but showing another hose embodiment in which one adhesive layer is laminated between the first and second reinforcing layers braided with RFL treated nylon fiber cords.

FIG. 2 exemplifies a hose 20 comprising an adhesive layer 21 applied between first and second reinforcing layers 23, 24. In this embodiment the two layers of reinforcement are braided with RFL treated nylon fiber cords. The hose 20 is applicable to automotive vehicles.

Figure 3:
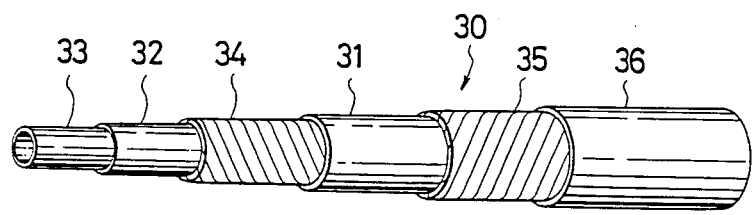
FIG. 3 is a view similar to FIG. 1, but showing a modified form of the embodiment of FIG. 1 in which two adhesive layers are applied between and among the inner tube and the first and the second reinforcing layer.

A hose 30 shown in FIG. 3 is a modified form of the embodiment of FIG. 1 in which a second adhesive layer 32 is applied between an inner rubber tube 33 and a first reinforcing layer 34. A first adhesive layer 31 is laminated between the first reinforcing layer 34 and a second reinforcing layer 35.

The following examples are given to further illustrate the invention.

EXAMPLE 1 AND COMPARATIVE EXAMPLES 1 AND 2

NBR rubber compositions were formulated and prepared as shown in Table 1. Formulation (A) involved using as essential components silica, resorcin, hexamethylenetetramine and mercaptotriazine, making an inventive composition. Formulation (B) was directed to a control in which were blended silica, resorcin and hexamethylenetetramine, and formulation (C) to another control in which silica and mercaptotriazine were combined.

Performance test was made under the following conditions and with the results given in Table 2.

1. Rubber-to-Wire Adhesion Test

The test compositions were molded into hose-like pieces on which brass plated wires were spirally wound. The molded pieces were steam-vulcanized at 150° C. for 30 minutes and placed in a temperature- and humidity-constant vessel with 50° C. and 95% RH for a predetermined length of time. They were thereafter cut into rings with a width of 25.4 mm, followed by determination of adhesion strength (kgf/25.4 mm) in accordance with JIS K 6301-7. Rubber covering was expressed in percent as the rate of the composition remaining covered on the wire wound surface after delamination.

2. Rubber-to-RFL Treated Fiber Cord Adhesion Test

Hose-like pieces were made on which RFL treated nylon fiber cords were spirally braided, followed by treatment and determination similar to test 1 above. Rubber covering was likewise expressed as the rate on the nylon braided surface.

3. Rubber-to-Rubber Adhesion Test

Rubber sheets of the test compositions were laminated with a sheet of a mating, unvulcanized rubber to be bonded. The laminated sheets were press-vulcanized at 150° C. for 30 minutes and cut into strips with a width of 25.4 mm, followed by delamination in accordance with JIS K 6301-7. Rubber covering was determined in the same manner as in test 1.

As is clearly evident from Table 2, the composition of Example 1 embodying the invention is highly satisfactory in respect of the adhesion to brass plated wires, to RFL treated nylon fiber cords and to mating rubber both at the initial stage and after prolonged aging under hot and humid conditions. The control in Comparative Example 1 failed to give sufficient adhesion to all such metallic, fibrous and rubber materials when exposed to hot and humid aging. Comparative Example 2 was insufficient in rubber-to-fiber cord adhesion and also in rubber-to-rubber adhesion.

EXAMPLE 2 AND COMPARATIVE EXAMPLES 3 AND 4

Inventive and comparative SBR/NR rubber compositions were prepard, as shown in Table 3, with use of formulations (D), (E) and (F) which were similar in that order to formulations (A), (B) and (C) of Table 1 for the NBR compositions as regards the essential components. The SBR/NR compositions were tested under the same conditions as in test 1 and with the results given in Table 4.

The invention composition of Example 2 has been found highly satisfactory as regards the adhesion to brass plated wires, RFL treated nylon fiber cords and mating rubber even after prolonged exposure to a hot and humid atmosphere. Comparative Example 3 revealed reduced adhesion to all such materials when aged in a similar ambient atmosphere. Comparative Example 4 was insufficient in rubber-to-rubber adhesion.

EXAMPLE 3 AND COMPARATIVE EXAMPLES 5 AND 6

Hydraulic hoses were made which had two layers of reinforcement wound with brass plated wires and which incorporated an adhesive layer derived from one of formulations (A), (B) and (C) and disposed between the reinforcing layers. The hoses were kept in a temperature- and humidity-constant vessel with 50° C. and 95% RH for a predetermined length of time, followed by delamination of the wires to thereby determine the covering rate on the wire wound surface. The results obtained are shown in Table 5.

EXAMPLE 4 AND COMPARATIVE EXAMPLES 7 AND 8

Automotive hoses were made which had two reinforcing layers braided with RFL treated nylon fiber cords and which were provided with an adhesive layer derived from one of formulations (A), (B) and (C) and applied between the reinforcing layers. The hoses were treated and delaminated in a manner similar to Example 3 and to Comparative Examples 5 and 6 to thereby determine the covering rate on the cord braided surface. The results obtained are shown in Table 6.

It is to be noted as appears from Tables 5 and 6 that the inventive hoses of Examples 3 and 4 are both satisfactory in respect of adhesion even after hot and humid aging. Comparative Examples 5 and 7 gave insufficient adhesion when exposed to a similar aging atmosphere. The control of Comparative Example 6 was irregular in adhesion, whereas the control of Comparative Example 8 revealed reduced adhesion.

EXAMPLE 5 AND COMPARATIVE EXAMPLES 9 AND 10

The procedures of Example 3 and Comparative Examples 5 and 6 were followed except that two adhesive layers were applied, one being over the inner tube and the other over the first reinforcing layer. The resulting hydraulic hoses were tested for durability under the following conditions and with the results given in Table 7; the hoses after being filled with water were subjected to repeated pressure test until water leakage took place.

fluid: water
pressure: 0–200 kgf/cm$^2$
temperature: 80° C.
cycle: one cycle of run consisting of one hour under pressure and 15 minutes at atmospheric pressure It has been confirmed that the invention hose of Example 5 is highly durable as evidenced by a lapse of 270 hours prior to its failure. Each of the controls in Comparative Examples 9 and 10 caused fast malfunction due to delamination between the inner tube and the adhesive layer.

TABLE 1

(Formulation: NBR Rubber)

| Formulation | Example 1 (A) | Comparative Example 1 (B) | Comparative Example 2 (C) | Mating Rubber |
|---|---|---|---|---|
| NIPOL 1042 (1) | 100 | 100 | 100 | 100 |
| SFR (carbon) (2) | 60 | 60 | 60 | 90 |
| Nipsil VN3 (3) (silica) | 20 | 20 | 20 | |
| ZnO | 5 | 5 | 5 | 5 |
| stearic acid | 1 | 1 | 1 | 1 |
| resorcin (4) | 3 | 3 | | |
| Zisnet F (5) | 2 | | 2 | |
| DOP (6) | 20 | 20 | 20 | 10 |
| sulfur | 2 | 2 | 2 | 0.7 |
| Sunceller CM-PO (7) | 1 | 1.5 | 1 | 1.5 |
| Nocceller H (8) | 2 | 2 | | |
| Sunceller TT-PO (9) | | | | 1 |

Note:
(1) Nippon Geon Co.
(2) Asahi Carbon Co.
(3) Nippon Silica Industries Ltd.
(4) Sumitomo Chemical Co.
(5) 2,4,6-trimercapto-1,3,5-triazine
(6) Chisso Petrochemical Co.
(7) vulcanizing accelerator, Ohuchi Shinko Chemical Ltd.
(8) hexamethylenetetramine, Ohuchi Shinko Chemical Ltd.
(9) vulcanizing accelerator, Ohuchi Shinko Chemical Ltd.

TABLE 2

(Adhesion Test: NBR Rubber)

| Adhesion Test formulation<br>adhesion strength/rubber covering | Example 1 (A) | | Comparative Example 1 (B) | | Comparative Example 2 (C) | |
|---|---|---|---|---|---|---|
| | kgf/25.4 mm | % | kgf/25.4 mm | % | kgf/25.4 mm | % |
| rubber/wire | | | | | | |
| initial | 34 | 100 | 33 | 95 | 30 | 90 |
| 50° C. × 95% RH × 1 W | 28 | 100 | 26 | 90 | 26 | 80 |
| 50° C. × 95% RH × 2 W | 26 | 100 | 16 | 70 | 26 | 80 |
| 50° C. × 95% RH × 3 W | 29 | 95 | 12 | 30 | 27 | 80 |
| 50° C. × 95% RH × 4 W | 28 | 95 | 6 | 5 | 25 | 80 |
| rubber/nylon fiber cord | | | | | | |
| initial | 35 | 100 | 30 | 100 | 8 | 0 |
| 50° C. × 95% RH × 1 W | 30 | 100 | 25 | 60 | 6 | 0 |
| 50° C. × 95% RH × 2 W | 32 | 95 | 20 | 30 | 6 | 0 |
| 50° C. × 95% RH × 3 W | 29 | 95 | 18 | 5 | 5 | 0 |
| 50° C. × 95% RH × 4 W | 30 | 95 | 11 | 5 | 6 | 0 |
| rubber/rubber | | | | | | |
| initial | 30 | 100 | 29 | 100 | 4 | 0 |
| 50° C. × 95% RH × 1 W | 37 | 100 | 24 | 90 | 5 | 0 |
| 50° C. × 95% RH × 2 W | 30 | 100 | 24 | 90 | 3 | 0 |
| 50° C. × 95% RH × 3 W | 33 | 100 | 21 | 70 | 3 | 0 |
| 50° C. × 95% RH × 4 W | 35 | 100 | 15 | 50 | 2 | 0 |

(W: week)

TABLE 3

| Formulation | | Example 2 (D) | Comparative Example 3 (E) | Comparative Example 4 (F) | Mating Rubber |
|---|---|---|---|---|---|
| NR (RSS#4) | | 100 | 100 | 100 | 70 |
| NIPOL 1502 | (10) | | | | 30 |
| HAF (carbon) | (11) | 40 | 40 | 40 | 50 |
| Nipsil VN3 (silica) | (3) | 10 | 10 | 10 | |
| ZnO | | 5 | 5 | 5 | 5 |
| stearic acid | | 1 | 1 | 1 | 1 |
| resorcin | (4) | 3 | 3 | | |
| Zisnet F | (5) | 2 | | 2 | |
| oil (aromatic) | | 5 | 5 | 5 | 5 |
| sulfur | | 2 | 2 | 2 | 0.5 |
| Sunceller CM-PO | (7) | 1 | 1 | 1 | 1.5 |
| Nocceller H | (8) | 1 | 1 | | |
| Sunceller TT-PO | (9) | | | 1 | 1 |

Note:
(10) Nippon Geon Co.
(11) Tokai Carbon Co.
(3), (4), (5), (7), (8) and (9): same as in Table 1

TABLE 4

(Adhesion Test: SBR/NR Rubber)

| Adhesion Test formulation<br>adhesion strength/rubber covering | Example 2 (D) | | Comparative Example 3 (E) | | Comparative Example 4 (F) | |
|---|---|---|---|---|---|---|
| | kgf/25.4 mm | % | kgf/25.4 mm | % | kgf/25.4 mm | % |
| rubber/wire | | | | | | |
| initial | 27 | 100 | 26 | 100 | 18 | 70 |
| 50° C. × 95% RH × 1 W | 25 | 100 | 26 | 90 | 19 | 80 |
| 50° C. × 95% RH × 2 W | 23 | 95 | 19 | 60 | 17 | 80 |
| 50° C. × 95% RH × 3 W | 22 | 95 | 12 | 50 | 13 | 70 |
| 50° C. × 95% RH × 4 W | 24 | 95 | 6 | 10 | 14 | 60 |
| rubber/nylon fiber cord | | | | | | |
| initial | 26 | 100 | 27 | 100 | 24 | 70 |
| 50° C. × 95% RH × 1 W | 29 | 100 | 28 | 95 | 20 | 60 |
| 50° C. × 95% RH × 2 W | 25 | 95 | 24 | 90 | 22 | 50 |
| 50° C. × 95% RH × 3 W | 26 | 95 | 22 | 80 | 18 | 50 |
| 50° C. × 95% RH × 4 W | 26 | 95 | 18 | 40 | 18 | 30 |
| rubber/rubber | | | | | | |
| initial | 47 | 100 | 48 | 100 | 16 | 30 |
| 50° C. × 95% RH × 1 W | 50 | 100 | 46 | 100 | 16 | 30 |
| 50° C. × 95% RH × 2 W | 48 | 100 | 45 | 90 | 17 | 40 |
| 50° C. × 95% RH × 3 W | 44 | 100 | 37 | 80 | 14 | 20 |
| 50° C. × 95% RH × 4 W | 46 | 100 | 22 | 50 | 13 | 20 |

TABLE 5

Adhesion Test: NBR Rubber: Hose Reinforced with Brass Plated Wire

| Adhesion Test formulation | Example 3 (A) | Comparative Example 5 (B) | Comparative Example 6 (C) |
|---|---|---|---|
| initial | 100 | 95 | 90 |
| 50° C. × 95% RH × 1 W | 100 | 95 | 90 |
| 50° C. × 95% RH × 2 W | 100 | 60 | 80 |
| 50° C. × 95% RH × 3 W | 100 | 60 | 80 |
| 50° C. × 95% RH × 4 W | 100 | 30 | 70 |

(W: week)

(rubber covering after wire-wire delamination: %)

TABLE 6

Adhesion Test: NBR Rubber: Hose Reinforced with Nylon Fiber Cord

| Adhesion formulation | Example 4 (A) | Comparative Example 7 (B) | Comparative Example 8 (C) |
|---|---|---|---|
| initial | 100 | 100 | 10 |
| 50° C. × 95% RH × 1 W | 100 | 70 | 10 |
| 50° C. × 95% RH × 2 W | 95 | 50 | 10 |
| 50° C. × 95% RH × 3 W | 95 | 30 | 0 |
| 50° C. × 95% RH × 4 W | 95 | 30 | 0 |

(W: week)

(rubber covering after cord-cord delamination: %)

TABLE 7

Durability Test: NBR Rubber: Hose Reinforced with Brass Plated Wire

| Durability Test formulation | Example 5 (A) | Comparative Example 9 (B) | Comparative Example 10 (C) |
|---|---|---|---|
| time until hose failure (leakage) occurred (hr) | 270 | 190 | 10 |

What is claimed is:

1. A rubber composition comprising a starting rubber vulcanizable with sulfur, wiith which is combined:
   (a) silica, in an amount of 1–100 parts;
   (b) a resorcin donor, in an amount of 0.5–20 parts;
   (c) methylene donor, in an amount of 0.1–10 parts; and
   (d) an organic sulfur-containing compound, in an amount of 0.1–15 parts, respectively, by weight of 100 parts of said starting rubber,
   wherein said sulfur-containing compound is a compound represented by the following formula:

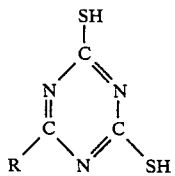

wherein R is a mercapto, alkoxy, mono- or di-alkyl amino, mono- or di-cycloalkyl amino, mono- or di-aryl amino or N-alkyl-N'-aryl amino group.

2. The composition of claim 1, wherein said sulfur-containing compound is 2,4,6-trimercapto-1,3,5-triazine.

3. The composition of claim 1, wherein said starting rubber is natural rubber, isoprene rubber, styrene rubber or acrylonitrile-butadiene rubber, or a combination there; said resorcin donor is resorcin; said methylene donor is hexamethylenetetramine; and said sulfur-containing compound is 2,4,6-trimercapto-1,3,5-triazine.

4. The rubber composition according to claim 1 wherein said starting rubber is natural rubber, isoprene rubber, styrene rubber of acrylonitrile-butadiene rubber, or a combination thereof.

* * * * *